Jan. 26, 1960 C. VERNHES ET AL 2,923,006
DEVICES FOR THE MEASUREMENTS OF ANGULAR DIFFERENCES
Filed March 6, 1956 2 Sheets-Sheet 1

INVENTORS
CLAUDE VERNHES AND
GEORGES BOISSINOT
BY Paul M. Craig Jr.
ATTORNEY

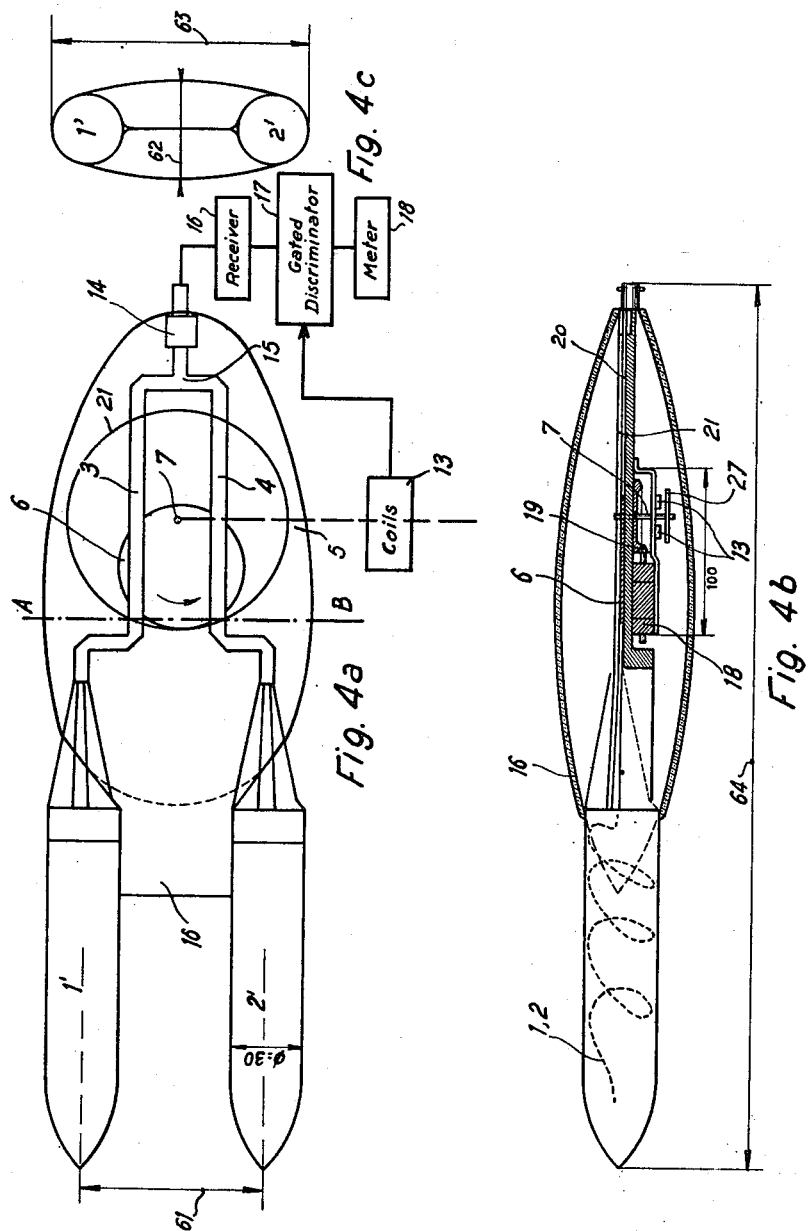

United States Patent Office 2,923,006
Patented Jan. 26, 1960

2,923,006

DEVICES FOR THE MEASUREMENTS OF ANGULAR DIFFERENCES

Claude Vernhes and Georges Boissinot, Paris, France, assignors to Compagnie Generale de Telegraphie Sans Fil, a corporation of France Application March 6, 1956, Serial No. 569,711

Claims priority, application France March 17, 1955

5 Claims. (Cl. 343—113)

The object of the present invention is the design of a device for measuring quasi continuously the angle between the plane of symmetry of a first object which may be fixed or moving and a straight line through said object and a second object which also may be fixed or moving.

All known devices of this type comprise, necessarily, highly directive and bulky aerials, which are unsuitable for certain applications.

According to the present invention, the device consists of two identical aerials situated close together set up on said first object symmetrically with respect to its plane of symmetry their radiation diagrams substantially coinciding, said two aerials being connected together, by two transmission lines and by a T junction, to a receiver mixer or detector crystal, so that electric ultra high frequency voltage applied to said crystal is the difference between the voltages due to the fields radiated or reflected by said second object and received respectively by two aerials.

A phase shifter, to which a periodic motion is applied, introduces a systematic phase shift varying periodically with time according to some prearranged law in at least one of those lines.

The amplitude difference of the maximum values of the ultra high frequency voltages applied to said crystal is brought out at the receiver output in the form of an electric quantity which is a function of the angle to be measured and which changes sign with said angle.

It is shown that this amplitude difference is a function of the phase difference of the electric fields received respectively by the two aerials.

The invention is illustrated and further explained by means of the accompanying drawings, wherein:

Fig. 4a represents a plan view of the device with the cover removed;

Fig. 4b is a cross-section of the device along its own plane of symmetry;

Fig. 4c shows a cross-section through a plane taken along line AB of Figure 4a.

Figure 1:
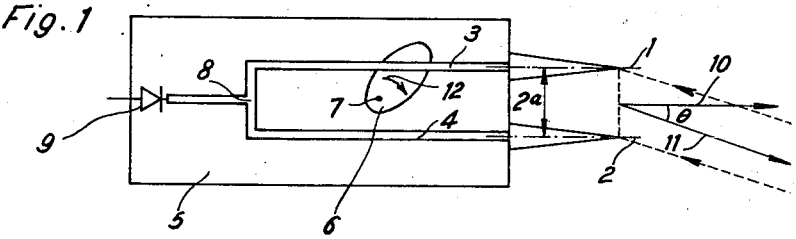
Fig. 1 shows diagrammatically the device according to the invention.

Referring to Figure 1, two identical parallel aerials 1 and 2, spaced apart by a distance $2a$ of the order of the operating wavelength of the device, are symmetrically located with respect to a plane of symmetry, normal to the plane of the figure, its trace being represented by arrow 10. The radiation diagrams of both aerials thus practically coincide. Two transmission lines 3 and 4, connected at one end to the aerials by any known means, are formed, for example, of metal strips parallel to a grounded conducting surface 5, such as a metal plate.

A phase shifter, located in a plane parallel to said plate and passing between the plane of said strips and the plate, comprises, for instance, a circular or elliptical disc 6, made of dielectric material; rotating uniformly about an eccentrically mounted axis 7, said disc is in this way more or less deeply inserted between at least one of these strips and the conducting plane 5 during its rotation. The other ends of these lines 3 and 4 feed, respectively the two inputs of a T-shaped junction 8, the output of which feeds a detector or mixer crystal 9 of some known receiver (not shown in the figure).

The direction of the radiating source or reflecting object to be detected is shown by arrow 11, arrows 10 and 11 forming together an angle $\theta$.

It is assumed that the axis of rotation 7 of the phase shifter is perpendicular to the lines 3 and 4 and is located in the plane of symmetry of the device.

According to the invention, the connection of the transmission lines 3 and 4 to the detector 9 is effected in such a way that the resulting ultra high frequency voltage E applied to the detector 9 is equal to the difference of the voltage $E_1$ and $E_2$, resulting, respectively, from the two aerials 1 and 2 and transmitted by the lines 3 and 4.

Under these conditions, calculation performed by the applicants, and confirmed by experiment, shows that the difference $E = E_1 - E_2$ is given by the following equation:

$$E = E_{max} \cdot \sin\left[\frac{2a \sin \theta}{\lambda} + \phi(t)\right]$$

wherein:

$E_{max}$ is the amplitude of the voltage due to the field received by the two aerials, assumed to be independent of angle $\theta$;

$\phi(t)$ is the periodic phase shift introduced by disc 6 into one of the lines;

$\lambda$ is the operating wave length in free space.

During one cycle of $\phi(t)$, and for a fixed value of $\theta$, E presents two peak values obtained, respectively, for the maximum and minimum values of $\phi(t)$, i.e. for $\phi = \pm \phi M$ under the conditions that:

$$\frac{2\pi a \sin \theta}{\lambda} + \phi M \leq \frac{\pi}{2}$$

the symbol $\phi M$ designating the two extreme values of the phase shift appearing under the action of disc 6 in lines 3 and 4.

It should be noted that if $\phi(t)$ is sinusoidal, the phase shift $\phi M$ and $-\phi M$ occur at equal intervals every half period. This is the case when considering in preference a disc 6 of suitable shape.

Figure 2:
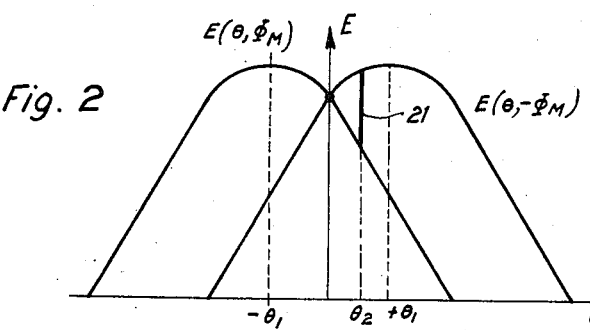
Figs. 2, 3a and 3b are graphs which illustrate the operation of the device of the Figure 1.

The curves shown in Figure 2 represent the respective variations of the values of E ($\Phi M$, $\theta$) and E ($-\Phi M$, $\theta$) as a function of $\theta$.

These curves are sinusoidal, with maxima corresponding to two opposite values $+\theta_1$ and $-\theta_1$ of the angle considered. It is interesting to note that this condition is met with only when the phase shifter 6 acts periodically on one at least of the two lines. The function $\phi(t)$ may be other than sinusoidal.

Means are provided for measuring the difference between the two values: E ($\Phi M$, $\theta$), E ($-\Phi M$, $\theta$), this difference represented by vector 21, being zero for $\theta = 0$, negative for $\theta < 0$, and positive for $\theta > 0$.

The result is substantially the same as that achieved using a lobe switching device.

The receiver, of conventional type, comprises means for determining the instants of maximum phase shift between the lines; these means are controlled by a device synchronized with the rotation of the phase shifter. Its output indicating device, for instance a center zero graduated meter, will thus allow the value and the sign of the angular difference $\theta$ to be determined.

Figure 3A:
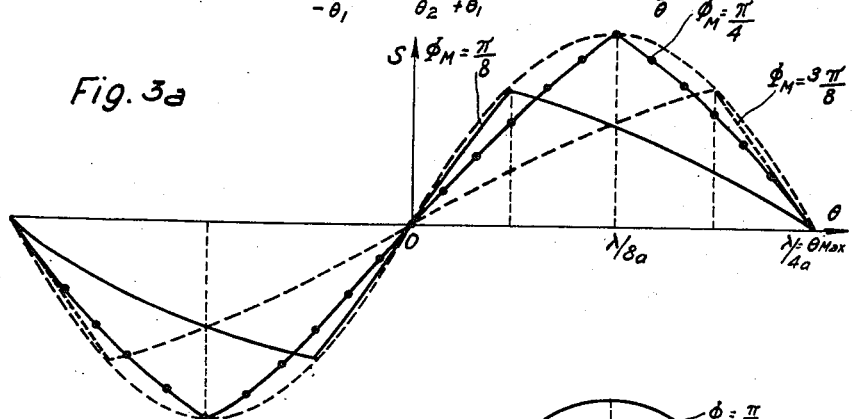
Figure 3B:
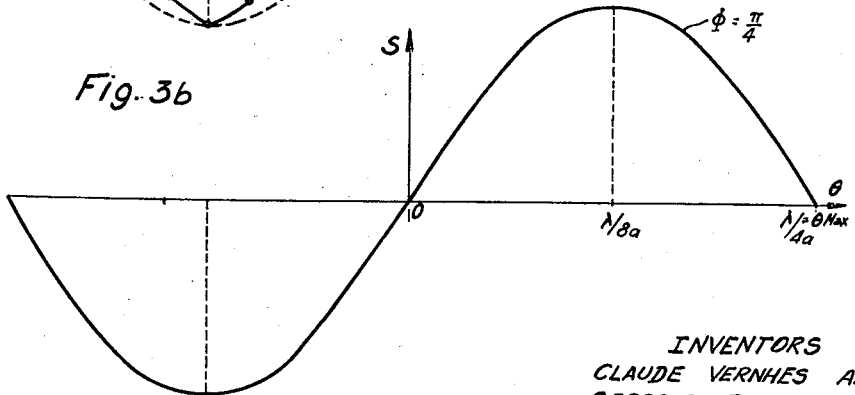

Figs. 3a and 3b are curves of angular difference measured with said device, i.e. the curves giving the variations of the amplitude of the output signal as a function of the angle $\theta$.

Fig. 3a concerns the case where the detector law is linear. In this case, the amplitude S of the output signal is proportional to vector 21. The various curves correspond to the different values of maximum phase shift φM.

Fig. 3b refers to a square law detector.

Calculation shows that for any given angle $\theta$, the maximum value of vector 21 in Figure 2 is obtained for a maximum phase shift φM of $$\frac{\pi}{4}$$

in practice, this is preferably the case.

Calculation also shows that the maximum angle which can be measured in this latter case is of about $$\theta = \frac{\lambda}{8a}$$

Beyond this value, angle $\theta$ is no longer measurable; the above mentioned results are not longer valid, since $$\frac{2\pi a \sin \theta}{\lambda} + \phi M > \frac{\pi}{2}$$

however, the sign of $\theta$ is known as long as vector 21 restrains the same sign, i.e. as long as $\theta$ keeps the value:

$$\theta_{max} = \frac{\lambda}{4a}$$

(Figs. 3a and 3b).

When the device is applied to guidance along a plane, the aperture angle of the system is thus of the order of $$\pm \frac{\lambda}{4a}$$

when the second object is located in a sector such as $$\frac{\pi}{8a} < \theta < \frac{\pi}{4a}$$

the voltage arising from angular difference falls as angle $\theta$ increases, but is still positive for $\theta > 0$ and negative for $\theta < 0$.

The band width of the device is about ±10% of the normal frequency for which it is designed. The operating wavelengths may be centimetric or decimetric.

The radiated wave may be continuous or modulated wave. In particular, the wave may be pulse modulated, the pulses having any duration and any recurrence frequency.

In order to enable those skilled in the art to put the invention into practice, the present description will now be completed by giving some details of a device tried by the applicants.

The general design of the device—excluding the receiver itself—is illustrated in Figures 4a, 4b and 4c.

The device comprises essentially:

(1) A system of two identical, parallel aerials, 1 and 2, the spacing 61 of which is equal to one wavelength, that is, about 10 centimeters in the case under consideration. They are located in specially shaped casings 1' and 2', made of rigid fiber glass or like material.

These aerials 1 and 2 (Fig. 4b) are of the helical type, with a wide operating band-width, radiating at one end, a circularly polarized wave. This type of aerial provides the following advantages: it enables reception to be independent of the polarization of the received wave; the degree of decoupling between the aerials is above 40 db; an additional phase shift $\pi$ is introduced between the two received waves for any operating frequency, by simple rotation of one of the aerials about its axis, the other remaining stationary.

This is due to the characteristics of helical aerials, object of a French patent, filed November 26, 1954, for "Phase Shift Device for Ultra High Frequency Waves," granted December 26, 1955, and published April 19, 1956.

(2) Two transmission lines 3 and 4, designed in the form of metal strips 5 mm. wide and placed 3 mm. above the grounded metal plane 5.

The mechanical support for these strips is provided by a plate 21 of rigid fiber glass or like material, placed in the metal plate 5. These strips consist of a silver or copper film applied on said plate by a photo engraving process. The plate 21 is provided with a recess 20 for the phase shifter.

(3) A phase shifting device, adapted for periodically varying the phase of the wave received by the aerials. The maximum phase shift between the transmission lines has been set at $$\frac{\pi}{2}$$

for the mid band value of the operating frequency (3,000 mc./s.).

The phase shifter is a circular disc 6 of rigid fiber glass or similar material of 60 mm. diameter. The disc rotates in the recess 20 around the eccentrically disposed shaft 7, normal to the plane of the transmission lines 3 and 4 and located in the middle of the space between the two lines. The off-center rotation of disc 6 creates a periodic variation of the difference between the respective electric lengths of the transmission lines 3 and 4.

During one revolution of disc 7 this difference passes through two maximum values which correspond respectively to the instants of maximum overlapping of the disc by the two lines.

(4) A synchronizing and control device, shown in Fig. 4b, comprising a small magnetized bar 27, driven by shaft 7 rotating the phase shifting disc 6. This magnet rotates above two field coils 13, symmetrically placed with respect to said shaft, and enables the instants of maximum phase shift between the lines to be determined. This can be done, for example, by using the voltage induced at these instants in coils 13 for causing gated amplitude discriminator 17 to provide an output signal which is the difference between the signals received at those instants. As has been indicated above, this difference is proportional to the angle to be measured and its sign changes when the sign of this angle changes. A small motor 18 drives shaft 7 through gear 19.

(5) A detector 14 (Fig. 4a) is located at the output of a T junction 15, thus ensuring the geometric summation of the fields received by the two aerials.

The device comprises only one receiver 16 of any conventional type. This receiver includes, after the amplifier stage, balanced discriminator 17 which is unblocked as indicated above the output of which is applied to an indicating device 18, for example, a graduated center zero meter, when used for the measurement of angular differences.

Also, automatic gain control of known design included in the receiver utilises a voltage proportional to the peak voltage of the signal to be analyzed, for increasing the sensitivity of the device.

Fig. 4c is a cross-section of the device through a plane along line AB in Fig. 4a. It forms an ellipse the length of whose axes 62 and 63 are, respectively, 15 and 6 cm. Casing 16 (Fig. 4a), which also carries the device as a whole, including the aerials, is made of rigid fiber glass or other like material.

The overall length 64 of the unit, including the aerials, is 50 cm. The results obtained during tests are as follows:

The angle of search is ±10% with respect to the plane of reference.

The receiver output current passing through the center zero meter varies proportionately to the angular difference from 0 to 1°, and then remains constant up to 10°.

The minimum measurable angle is 3 minutes of arc, to which value corresponds an output current of 0.5 ma. for a power receiver by the aerials of $10^{-8}$ watt.

It is, of course, to be understood that the invention is in no way limited to the embodiments illustrated and described, these being given only as an example. The main and practical features of the device according to the invention are:

Reduced size, enabling the device to be easily mounted on various types of carrier especially since its aerials are identical, stationary and laid parallel to one another;

The rapidity with which information is transmitted on account of the simplicity of its mobile elements;

The rapidity of measurement;

The wide angle of reception.

We claim:

1. A device for measuring the angle between the plane of symmetry of a first object and a straight line through said first and a second object, said device comprising in combination: a first and a second radiating aerial, for ultra high frequency waves, carried by said first object, having substantially the same radiation diagram and located symmetrically with respect to said plane of symmetry; a first and a second transmission line; a junction device having a first and a second input and one output, said first and said second line connecting respectively said first and said second aerials to the first and second input of said junction device; phase shifting means for varying periodically the difference between the respective electric lengths of said lines; a receiver comprising a crystal connected to said output of said junction device, whereby the electric voltage applied to said crystal is the difference between the respective voltages due to the fields radiated by said second object, received respectively by said first and said second aerials and transmitted respectively by said first and second transmission lines; a gated amplitude discriminator; means synchronized with said phase shifting means, for obtaining gating pulses at the respective instants of maximum and minimum of said difference of electric length and means for unblocking by said gating pulses said gated amplitude discriminator and measuring the difference of amplitudes of the voltage collected at the output of said crystal at said respective instants.

2. A device for measuring the angle between the plane of symmetry of a first object and a straight line through said first and a second object, at least one of said first and second objects being moving said device comprising in combination: a first and a second radiating aerial, for ultra high frequency waves, carried by said first object, having substantially the same radiation diagram, and located symmetrically with respect to said plane of symmetry; a first and a second transmission line and a junction device having a first and a second input and one output, said first and said second line connecting respectively said first and said second aerials to the first and second output of said junction device; at least in said first line, a rotating phase shifter, means for rotating said phase shifter and for varying sinusoidally the difference between the respective electric lengths of said line; a receiver comprising a crystal connected to said output of said junction device, whereby the electric voltage applied to said crystal is the difference between the respective voltages due to the fields radiated by said second object received respectively by said first and said second aerial and transmitted respectively by said first and said second transmission line; a gated amplitude dicriminator; means synchronized with said rotating means, for obtaining gating pulses at the respective instants of maximum and minimum of said difference of electric length, and means for unblocking by said gating pulses said gated amplitude discriminator and measuring the difference of amplitudes of the voltage collected at the output of said crystal, at said respective instants.

3. A device for measuring the angle between the plane of symmetry of a first object and a straight line through said first and a second object, at least one of said first and second objects being moving said device comprising in combination: a first and a second radiating aerial, for ultra high frequency waves, carried by said first object, having substantially the same radiation diagram and located symmetrically with respect to said plane of symmetry; a first and a second metal strip, a grounded conductive surface and a junction device having a first and a second input and one output, said first and said second metal strips and said conductive surface connecting respectively said first and said second aerials to the first and second inputs of said junction device, and in at least said first line, an elliptic disc having an eccentrically mounted axis and able to be inserted between at least said first strip and said surface; means for rotating said disc, about said axis for varying sinusoidally the difference between the respective electric length of said strips; a receiver comprising a crystal, connected to said output of said junction device, whereby the electric voltage applied to said crystal is the difference between the respective voltages due to the fields radiated by said second object, received respectively by said first and said second aerial and transmitted respectively by said first and said second strips a gated amplitude discriminator; means synchronized with said rotating means for obtaining gating pulses at the respective instants of maximum and minimum of said difference of electric lengths and means for unblocking by said gating pulses said gated amplitude discriminator and measuring the difference of amplitudes of the ultra high frequency voltage collected at the output of said crystal at said respective instants.

4. A device according to claim 1 wherein said aerials are of helical form.

5. A device according to claim 3 wherein said means for obtaining gating pulses comprises a small magnetized bar, driven by said eccentrically mounted axis and two fixed field coils symmetrically placed with respect to said axis.

References Cited in the file of this patent

UNITED STATES PATENTS 2,474,268     Marchand _____ June 28, 1949

FOREIGN PATENTS 706,090     Great Britain _____ Mar. 24, 1954